(No Model.)

J. SOMMER.
VEHICLE.

No. 474,535.  Patented May 10, 1892.

Witnesses
C. C. Burdine
Geo. L. Wheelock

Inventor
Jacques Sommer
per R. G. DuBois
his Attorney.

THE NORRIS PETERS CO., PHOTO-LITHO., WASHINGTON, D. C.

United States Patent Office.

JACQUES SOMMER, OF SEATTLE, WASHINGTON, ASSIGNOR OF ONE-TENTH TO DIETRICH ROHLFS AND HERMAN SCHODER, OF SAME PLACE.

VEHICLE.

SPECIFICATION forming part of Letters Patent No. 474,535, dated May 10, 1892.

Application filed June 17, 1891. Serial No. 396,623. (No model.)

*To all whom it may concern:*

Be it known that I, JACQUES SOMMER, a subject of the Emperor of Germany, residing at Seattle, in the county of King and State of Washington, have invented certain new and useful Improvements in Vehicles; and I do hereby declare the following to be a full, clear, and exact description of the invention, such as will enable others skilled in the art to which it appertains to make and use the same.

My invention relates to an improvement in vehicles, its object being to provide a vehicle that will attain a high rate of speed.

To this end my invention consists in certain features of construction to be hereinafter described, and then particularly pointed out in the claim.

Figure 1:
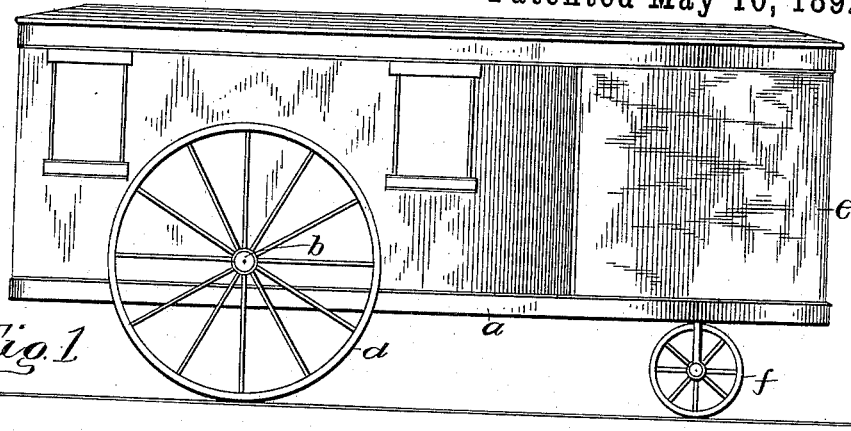
Figure 2:
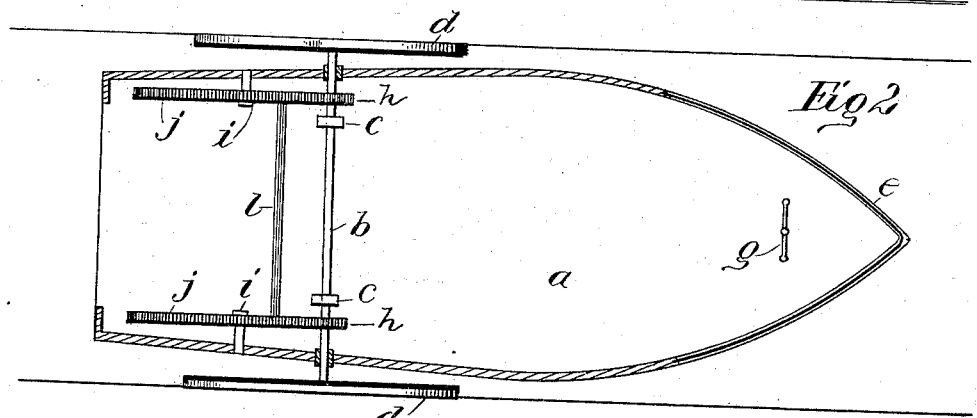
Figure 3:
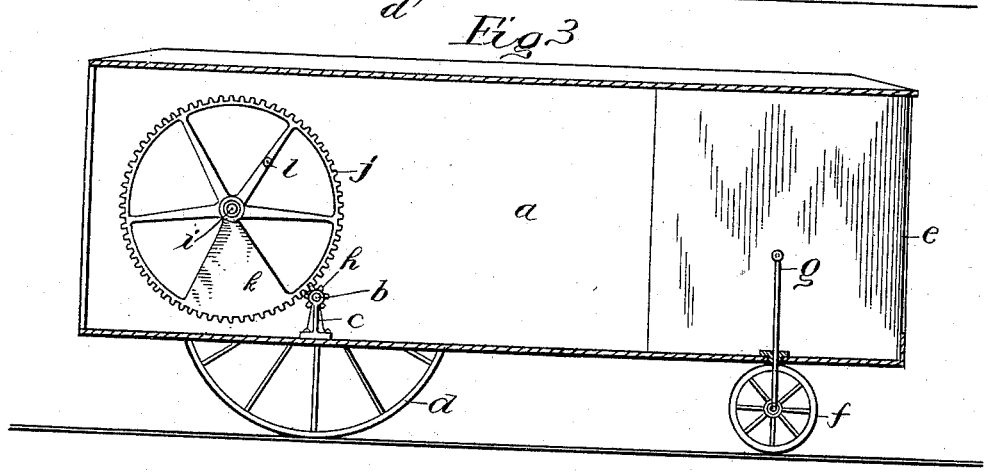

In the accompanying drawings, Figure 1 is a side elevation of my improved vehicle. Fig. 2 is a horizontal longitudinal section, and Fig. 3 is a vertical longitudinal section thereof.

$a$ is the body of the vehicle, which is provided with an axle or rotary shaft $b$, which passes through the sides of the body, and is journaled in bearings $c$, and has drive-wheels $d$ at each end. The body is open at its rear end and is wedge shape or pointed at its front end whose sides are formed of glass $e$ in V shape. The front end of the body is supported by a steering-wheel $f$, which is operated by the pilot through the medium of handle $g$. The pilot may see in front and to the sides of the vehicle through the glass front.

The shaft $b$ is provided with a pair of small gear-wheels or pinions $h$, (only one of which can be seen,) arranged one near each end between the bearings $c$ and the sides of the body. Behind the shaft $b$ and projecting from the sides of the body toward one another are short spindles $i$, on which are journaled a pair of large gear-wheels $j$, which intermesh with the gear-wheels $h$. Each wheel $j$ is weighted at $k$, and they are connected near their peripheries by a hand-bar $l$, by which the operator of the vehicle propels the same.

As the gear-wheels $j$ are ten times the diameter of the gear-wheels $h$, it will be seen that one revolution of the large gear-wheels causes the small gear-wheels to revolve ten times, and as the small gear-wheels $h$ are fixed to the shaft of the drive-wheels it follows that for every revolution of the large gear-wheels $j$ the drive-wheels revolve ten times. Consequently if the large gear-wheels $j$ revolve once in a second the driving-wheels will revolve ten times in a second or six hundred times in a minute, or thirty-six thousand times an hour. The vehicle will thus be propelled forward with great velocity.

The preferred size for the wheels is: for the large gear-wheels a diameter of thirty inches, for the small gear-wheels a diameter of three inches, and for the drive-wheels a diameter of forty inches; but of course the sizes of the wheels may be varied to suit the circumstances.

The short spindles $i$ permit the operator of the vehicle to stand between the wheels $j$ and operate them by means of the hand-bar $l$ when it is desired to actuate the wheels from the rear.

My invention is applicable to vessels, railway-cars, tricycles, and all classes of vehicles.

Having thus described my invention, what I claim as new therein, and desire to secure by Letters Patent, is—

In a vehicle, the combination of an oblong pointed body closed on all sides and provided with a front guide-wheel having a handle located within the body, observation-windows, a horizontal shaft through the body of the vehicle and provided with exterior traction-wheels, pinions fixed on the shaft within the body, a pair of large driving-gears meshing with said pinions, a pair of short inwardly-projecting pinions on which said drive-gears are centered, and a connecting-rod between the two for driving them in unison, all arranged and adapted to operate as specified.

In testimony whereof I affix my signature in presence of two witnesses.

JACQUES SOMMER.

Witnesses:
GEO. H. KING,
JOHN WALLACE.